J. L. WARE.
WATER POWER BLOWER.
APPLICATION FILED OCT. 8, 1908.
913,592.
Patented Feb. 23, 1909.
2 SHEETS—SHEET 1.
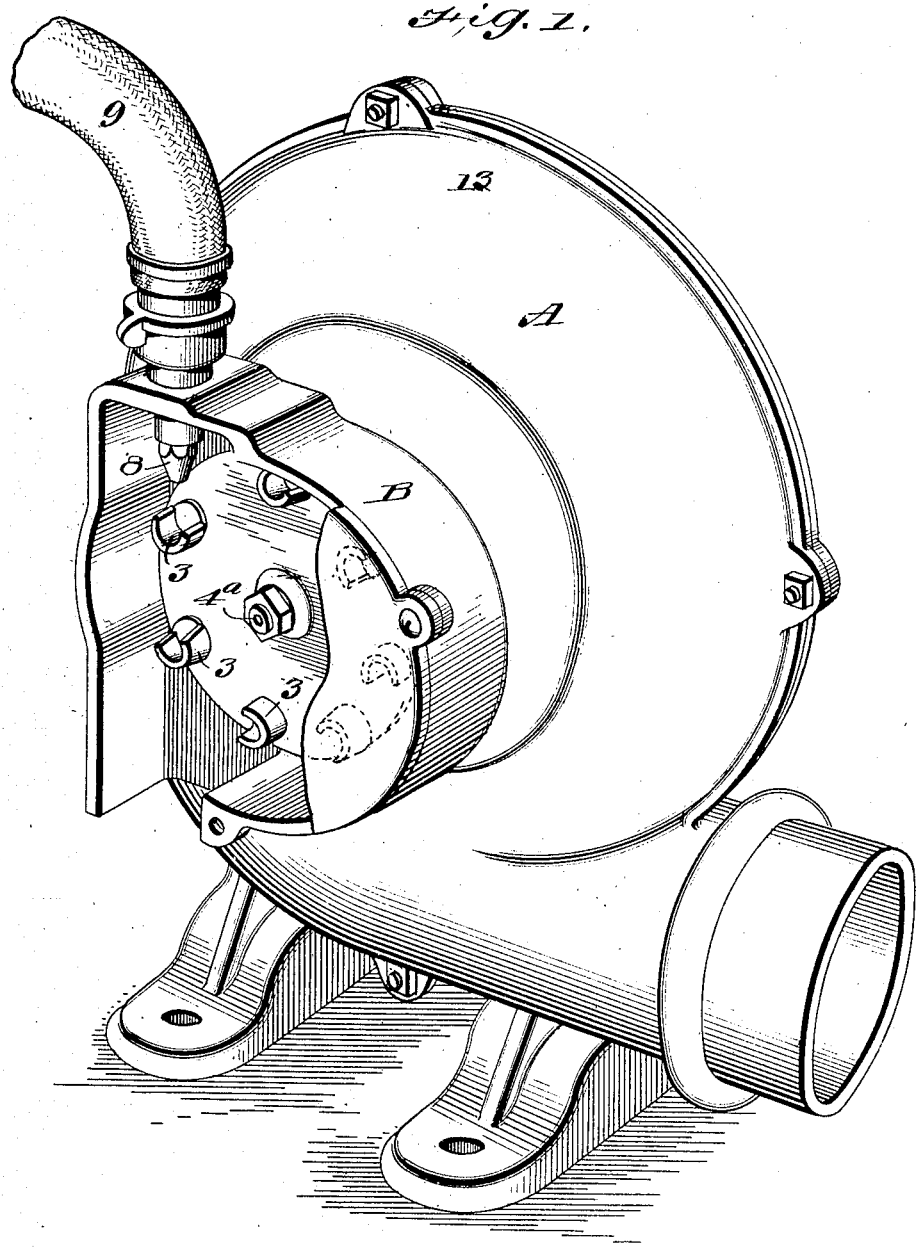
WITNESSES
T. C. Barry
L. A. Stanley
INVENTOR
JAMES L. WARE
BY Munn & Co.
ATTORNEYS J. L. WARE.
WATER POWER BLOWER.
APPLICATION FILED OCT. 6, 1908.
913,592.
Patented Feb. 23, 1909.
2 SHEETS—SHEET 2.
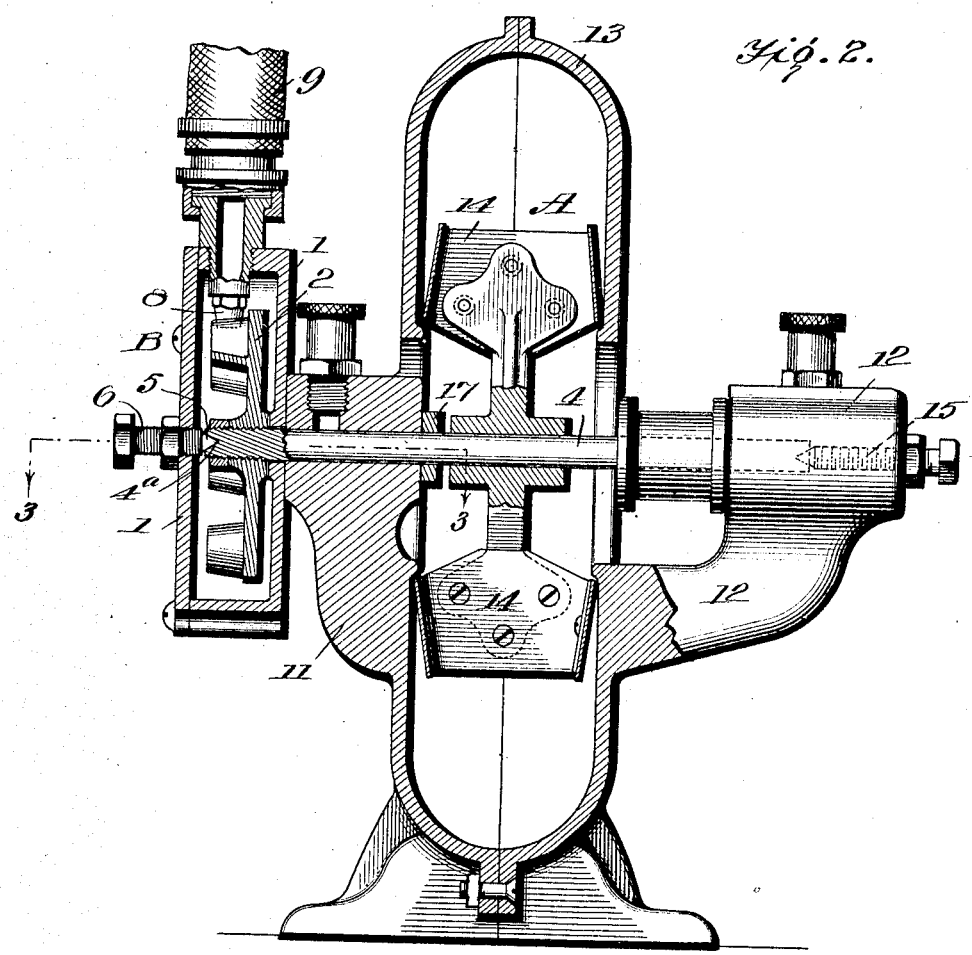
WITNESSES
L. H. Schmidt.
L. A. Stanley
INVENTOR
JAMES L. WARE,
BY Munn & Co.
ATTORNEYS

UNITED STATES PATENT OFFICE.

JAMES LAIRD WARE, OF TERRY, MISSISSIPPI.

WATER-POWER BLOWER.

No. 913,592.  Specification of Letters Patent.  Patented Feb. 23, 1909.

Application filed October 6, 1908. Serial No. 456,420.

*To all whom it may concern:*

Be it known that I, JAMES L. WARE, a citizen of the United States, and a resident of Terry, in the county of Hinds and State of Mississippi, have made certain new and useful Improvements in Water-Power Blowers, of which the following is a specification.

My invention relates to a blower for use especially in connection with the forges of machine shops and other metal working plants of a similar nature, and it consists of the arrangements, combinations and constructions herein described and claimed.

An object of my invention is to provide a combined blower and water motor having comparatively few connecting parts and thereby rendering the device of the highest efficiency.

A further object of my invention is to provide means whereby the combined device can be readily taken apart for inspection or repair and quickly reassembled.

My invention is illustrated in the accompanying drawings, in which—

Figure 1 is a perspective view of the invention, part of the casing of the water motor being broken away. Fig. 2 is a transverse vertical section through the device, and Fig. 3 is a horizontal section along the line 3—3 of Fig. 2.

Referring now to Fig. 1 I have shown therein a blower A of the ordinary type and connected to it a water motor B. The means by which I unite these two into a single device form the novel features of my invention. This is illustrated clearly in Fig. 2, in which the casing 1 of the motor incloses the wheel 2 bearing the cups 3. The wheel is secured by means of a screw connection to the end of a shaft 4, which is provided with a cone-shaped socket 4ª arranged to receive the point 5 of a bearing screw 6, the latter being provided with a lock nut 7. The wheel is driven by the water admitted through the nozzle 8 of the hose 9, which is secured in an opening of the casing 1. A lock nut 10 serves to retain the wheel 2 upon the shaft 4. The shaft 4 is arranged to pass through the supports 11 and 12 on each side of the blower casing 13 and the blades 14 of the blower are rigidly secured thereto. The end of the shaft in the support 12 is similarly cored out and is journaled on the pointed screw 15, thus reducing the friction to a minimum.

The inner side of the casing 1 of the water motor is provided with countersunk openings adapted to receive the heads of the bolts which extend alongside of the support 11 and pass through alined openings in a plate 17, which is perforated to permit the passage of the shaft 4 and which abuts the inner side of the support 11. The nuts 18 when tightened securely hold the casing 1 in close engagement with the side of the support 11.

It will be seen that the above described means for mounting the motor provides a firm support for the latter, while permitting its direct connection to the blower, thereby rendering the combined mechanism highly efficient.

I claim—

1. A combined water-motor and blower, comprising a casing, a water-power wheel mounted therein, a blower, standards therefor, a perforated plate disposed within said blower and abutting the inner side of one of said standards, bolts disposed in the openings in said plates and arranged to secure said casing against the outer side of said standard and a common shaft for said water-power wheel and said blower.

2. The combination of a blower, standards therefor, a plate on the inner side of one of said standards, a water wheel, a casing therefor arranged to abut the outer side of said standard, and connecting means between said casing and said plate.

JAMES LAIRD WARE.

Witnesses:
SEDLEY B. THOMAS,
C. P. MULLINS.